[11] 3,610,726

| [72] | Inventor | Sulo A. Aij<br>Attleboro, |
|---|---|---|
| [21] | Appl. No. | 18,841 |
| [22] | Filed | Mar. 12, 1970 |
| [45] | Patented | Oct. 5, 1971 |
| [73] | Assignee | Intricate Machine & Engineering Inc. |

[54] FIBER OPTICS PHOTOPROBE
5 Claims, 10 Drawing Figs.

| [52] | U.S. Cl. | 350/96 B,<br>355/1, 356/241, 95/11 HC |
|---|---|---|
| [51] | Int. Cl. | G02b 5/16 |
| [50] | Field of Search | 350/96 B;<br>355/1; 95/11 HC; 356/241 |

UNITED STATES PATENTS

| 2,975,785 | 3/1961 | Sheldon | 350/96 B X |
|---|---|---|---|
| 3,175,481 | 3/1965 | Lahr | 350/96 B X |
| 3,329,475 | 7/1967 | Hasala | 350/96 B X |
| 3,430,057 | 2/1969 | Genahr | 350/96 B X |

*Primary Examiner*—David H. Rubin
*Attorney*—Barlow and Barlow

ABSTRACT: A device for examining by photographic means opposite closely spaced walls or surfaces, the device consisting of two back-to-back units of identical construction, each having a head and a flexible tongue with the heads so shaped as to interfit when in opposed relation to align the tongues and position the viewing means in opposite directions.

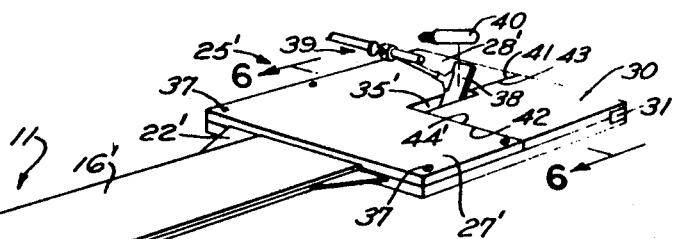
PATENTED OCT 5 1971
3,610,726
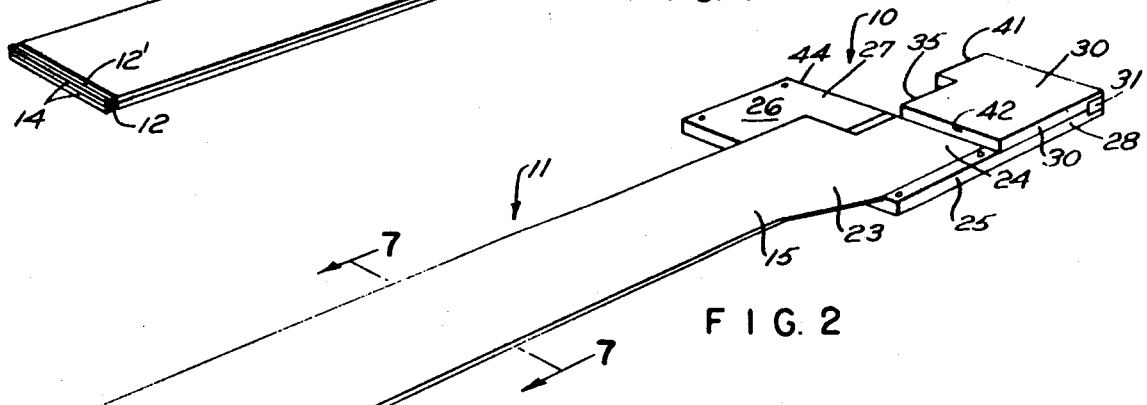
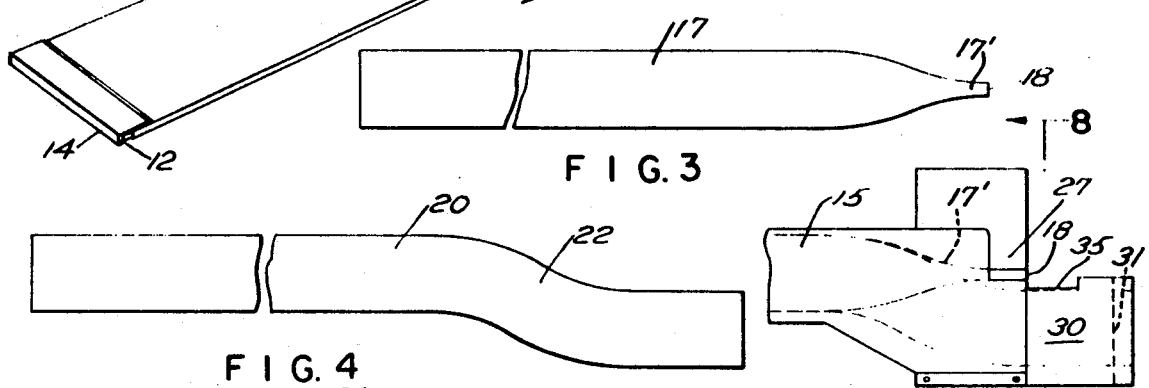
INVENTOR
SULO A. AIJALA
BY
Barlow & Barlow
ATTORNEYS

FIBER OPTICS PHOTOPROBE

BACKGROUND OF THE INVENTION

With the successful production of light-conducting fibers or light-transferring devices formed therefrom which basically are termed fiber optics, has evolved a number of optical image transfer devices which have utilized as the optical device a plurality of light-conducting fibers which have been arranged in parallel relationship to transfer an image from one position to another. For the physical inspection of deep and otherwise impenetrable and closely spaced plates, for example, there has been previously used a number of light-conducting fibers arranged in a parallel relationship into a tonguelike configuration. The light-conducting fibers would consist of a bundle of image-carrying fibers and a bundle of light-carrying fibers to illuminate a surface to be viewed, and the image pickup surface as well as the light source emergence surface would be juxtaposed in such a way that the part to be viewed photographically would be illuminated as the area was scanned. In use of this type of device film for image-recording medium would be moved past the image emergence surface of the fiber optic bundle that carried the image at the same speed that the end of the probe moved by the part to be viewed, in such a way that a continuous record could be obtained for the image-recording medium which could be photographic film. In certain applications where the space being reached must be inspected on the opposed surfaces of say a small slot, it would be necessary to pass the probe twice through the slot, first viewing one surface and then viewing the other. This is a time-consuming operation.

SUMMARY OF THE INVENTION

The device of this invention has a head and a tongue, the tongue having a plurality of image-conducting fibers therein and a reflecting prism at the end distant from the head which prism looks out upon one side of the tongue, while the tongue provides a second set of light-conducting fibers that direct light to the prism. The fibers may be constructed as disclosed in U.S. Pat. No. 3,060,789 or in equivalent fashions. The head from which the tongue extends is so shaped that when two like devices are placed back to back so that their viewing sides are outwardly disposed in the back-to-back relation, they will interfit together causing the tongues to be aligned and positioning the viewing means for viewing in opposite directions. Thus, by inserting two units in assembled relation, opposite walls of a small cavity may be viewed and photographed at the same time.

BRIEF DESCRIPTION OF THE DRAWINGS

FIG. 1 is a perspective view of two identical units in back-to-back relation;

FIG. 2 is a perspective view of the lower unit of the two units of FIG. 1;

FIG. 3 is a plan view of the light-transmitting laminate;

FIG. 4 is a plan view of the object-viewing laminate;

FIG. 5 is a fragmental top plan view of the light-transmitting and object-viewing laminates of the device assembled with the head and their protecting sheaths;

FIG. 6 is a section on line 6—6 of FIG. 1;

FIG. 7 is a section on line 7—7 of FIG. 2 on a larger scale than the preceding views;

FIG. 8 is a section on line 8—8 of FIG. 5;

FIG. 9 is an end view of the head of the two units assembled as shown in FIG. 1; and FIG. 10 is a side elevation of the end of one of the tongues on a larger scale.

DESCRIPTION OF THE PREFERRED EMBODIMENT

The photoprobe device of this invention can probably be best understood by referring to one of the halves of the units singly, and for this reason reference to FIG. 2 should be had. The photoprobe device comprises a pair of such units as shown in FIG. 2 that are mated one to the other in face-to-face relationship to produce the completed device as shown in FIG. 1. Each of the units comprises a head portion generally designated 10 and a tongue portion generally designated 11. The tongue is made up of two bundles of light-conducting fibers, there being a light-transmitting layer 17 and an image-transmitting layer 20. These fibers are preferably, but are not limited to, the clad type which have a core of a material having a relatively high index of refraction and an outer coating or a cladding of a material having a relatively low index of refraction. These light-conducting fibers that are arranged in the layers 17 and 20, which are shown more particularly in cross section in FIG. 7, are bonded together and encased in a protective sheet, such as sheet metal or the like, the sheet-encasing layers being designated 15 and 16. At the end of each tongue there is mounted a prism 12 having a reflecting surface 13, the prism being supported in proper position so that its reflecting surface is accurately oriented with respect to the layers 17 and 20 by a shield means 14 which is mounted on the encasing sheet layer 15. The light-transmitting layer 17 extends toward the head end of the tongue and the light-conducting fibers therein are bundled together into a narrowed neck portion 17' to terminate in an end 18. As will be seen particularly by referring to FIG. 6, the end 18 in cross section has been made semicircular. In this fashion the mating light-transmitting bundle can be juxtaposed to complete a circular configuration when the two tongues are placed back to back, as will presently appear. The image-transmitting layer 20 is offset as at 22 and terminates in a glass sandwich 31 which permits the end face thereof to be ground to an optical flat perpendicular to the longitudinal extent of the fibers in the layer 20 which enhances the transmission of the image to photosensitive sheet means.

The head 10 comprises an L-shaped piece of metal 25 with legs 27 and 28. The inner face 26 of the L-shaped portion 25 is recessed sufficiently so that the head end of the tongue will be received therein and surface of the sheet 15 will be substantially flush with the inner face 26. The leg 28 is partially covered by a plate 30 which plate 30 is of a thickness equal to the thickness of the L-shaped member 25. It is preferred that the L-shape portion of the head 25 and the cover plate 30 be of light-conducting material, but these could also, for example, be made from black glass or from steel or suitable plastics, which have been colored so that light will not be conducted therethrough, or are substantially opaque. The opaqueness is desired since the leg 28 has been notched as at 35 and it is within this notch that a source of illumination is projected.

It should be understood that the unit just described, which is illustrated in FIG. 2 of the drawings in assembled relationship, is one-half of the probe. Two portions identical to that shown in FIG. 2 are made and then one is reversed so that the exposed surface of the encasing sheet layer 15 and the surface 26 of the head are in face-to-face engagement. For convenience, the portion which is laid on top of the half-section shown in FIG. 2 utilizes the same reference numerals with a prime applied thereto and it will thus be seen that the edges 41, 41' will abut while the edge 42 of the plate 30 will abut the edge 44' of the leg 27'. The two halves may be suitably held together as for example by fastening means at 37 (see FIG. 1). In the end view of FIG. 9 with the two halves assembled, it will be seen that light-transmitting elements 20 and 20' will present two distinct separated areas which can transmit their images through suitable lens systems or the like onto image-capturing medium of the photosensitive type or the like. The bundle 20 which is to the left as seen in FIG. 9 will represent the part of the tongue that is looking downward as viewed in FIG. 1, while the bundle 20' will represent that looking upward as seen in FIG. 1.

The source of illumination that is provided and which is transmitted to the parts being viewed must be transmitted to the end 18 of the light-transmitting layers. As has been noted, a notch 35 is provided in the heads 25 and within this notch there may be received a mirror 38 that is mounted on a support bracket 39 which will reflect the rays of light coming from an illuminating bulb 40 onto the end 18 of the light-transmitting layer. The lamp 40 and the bracket 39 supporting the mirror 38 are located in an image-recording apparatus that is basically arranged to move the whole tongue assembly relative to the object that is being photographed or viewed and which also moves the image-recording medium at the same speed across an aperture or slit in much the same fashion that panoramic photography is achieved. In this way the tongue can view a rather deep distance in closely spaced objects and photograph the same, the only limitation of depth to be viewed being the length of the tongue 11 itself.

I claim:

1. A photoprobe device comprising two identical units, each comprising a head and an elongated flexible tongue extending therefrom, each tongue having a reflecting prism at its end distant from the head exposed for object viewing at one side of the tongue, each tongue having a first fiber optics bundle of thin cross section for transmitting light from the head to said prism and thence to the object to be viewed and a second juxtaposed fiber optics bundle of thin cross section to transmit the object view to the head by reflection of said prism, said second fiber optics bundle having an offset portion extending through said head, means on the heads to interfit when in opposed contiguous relation to align the tongues extending therefrom and to position said prisms for object viewing in opposite directions.

2. A photoprobe device as in claim 1 wherein said means on said heads comprises a first section of one area and thickness and a second section of one-half the area and twice the thickness of the first section.

3. A photoprobe device as in claim 2 wherein said sections are rectangular and generally right-angularly disposed.

4. A photoprobe device as in claim 1 wherein said heads are shaped so that when assembled an opening through the two heads is provided to a light source.

5. A photoprobe as in claim 4 wherein a mirror means is located in said opening.